(12) United States Patent
Toda et al.

(10) Patent No.: US 8,049,868 B2
(45) Date of Patent: Nov. 1, 2011

(54) CONCAVE-CONVEX SURFACE INSPECTION APPARATUS

(75) Inventors: Masataka Toda, Toyohashi (JP); Toshihiko Yoshikawa, Nishikamo-gun (JP); Katsuya Inuzuka, Anjo (JP); Koji Kuno, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 64 days.

(21) Appl. No.: 12/400,140

(22) Filed: Mar. 9, 2009

(65) Prior Publication Data

US 2009/0231570 A1    Sep. 17, 2009

(30) Foreign Application Priority Data

Mar. 13, 2008  (JP) ................................. 2008-064458

(51) Int. Cl.
*G01C 3/08*    (2006.01)
*G01N 21/00*   (2006.01)

(52) U.S. Cl. .................................. 356/4.01; 356/239.7
(58) Field of Classification Search .................. 356/4.01, 356/124, 239.1, 239.2, 239.7, 237.2
See application file for complete search history.

(56) References Cited

U.S. PATENT DOCUMENTS

| 4,736,229 A | 4/1988 | Holmberg et al. |
| 6,683,675 B2 | 1/2004 | Aoyama |
| 7,038,772 B2 * | 5/2006 | Chen et al. ................. 356/237.2 |
| 2004/0012775 A1 * | 1/2004 | Kinney et al. .............. 356/237.2 |
| 2008/0174771 A1 * | 7/2008 | Yan et al. ................... 356/237.5 |

FOREIGN PATENT DOCUMENTS

| DE | 197 21 688 A1 | 9/1998 |
| EP | 0 125 666 A2 | 11/1984 |
| JP | 4-301707 | 10/1992 |
| JP | 2001-194116 | 7/2001 |

* cited by examiner

*Primary Examiner* — Isam Alsomiri
(74) *Attorney, Agent, or Firm* — Oblon, Spivak, McClelland, Maier & Neustadt, L.L.P.

(57) ABSTRACT

A concave-convex surface inspection apparatus includes a slit light source unit emitting a slit light to a concave-convex surface of an object to be inspected, an image-taking unit taking an image of the concave-convex surface illuminated by the emitted slit light with an imaging optical axis intersecting with an optical axis of the slit light with a narrow-angle equal to or narrower than 30 degrees, and an evaluation section obtaining a three dimensional shape of the concave-convex surface and evaluating the obtained three dimensional shape, wherein the slit light source unit includes a slit light source and a cylindrical lens, the image-taking unit includes a telecentric lens unit, an image-taking section having an imaging surface tilted relative to the imaging optical axis for increasing a focusing range of the concave-convex surface, and a P polarizer.

6 Claims, 5 Drawing Sheets

CONCAVE-CONVEX SURFACE INSPECTION APPARATUS

CROSS REFERENCE TO RELATED APPLICATIONS

This application is based on and claims priority under 35 U.S.C. §119 to Japanese Patent Application 2008-064458, filed on Mar. 13, 2008, the entire contents of which is incorporated herein by reference.

FIELD OF THE INVENTION

The present invention relates to a concave-convex surface inspection apparatus.

BACKGROUND

As a concave-convex surface inspection apparatus, an apparatus having a slit light source emitting a slit light to an object to be measured, a camera taking a slit image of the object to be measured when the object to be measured is illuminated with the slit light, and an image processing section obtaining three dimensional data from the slit image taken by the camera is known (for example, JP H4-301707A, paragraphs 0005 and 0006 and FIG. 3). In the known device, the slit light beams are diffused in a shape of a fan relative to an optical axis of the slit light. Therefore, when inspecting a surface on which a number of relatively deep grooves are formed, blind spots are generated in grooves which receive slit light beams that are projected away from the optical axis. Consequently, the image of the surface illuminated with the slit light beams which are diffused in the shape of the fan includes the groove whose bottom portion is not completely captured in the image. As a result, a problem arises that a shape of the hidden portion of the groove is not measured.

Further, a height measuring apparatus having a light source emitting a slit light to an object to be measured from an oblique direction, image sensors taking images of the object to be measured illuminated by the reflected slit light via each of telecentric lenses, and an image processing means obtaining a height of the object to be measured based on the images of the object to be measured illuminated by the reflected slit light taken by the image sensor is known (for example, JP 2001-194116A, paragraphs 0011 and 0012 and FIG. 1). The known apparatus further includes a half mirror positioned in a direction in which the slit light is reflected from a surface of an object to be measured. The reflected image of the slit light passes through the half mirror and reflects on a surface of the half mirror in a different direction from the direction that the reflected image passes through the half mirror. Consequently, each of the image sensors is positioned so as to take the reflected image that passes through the half mirror and the reflected image that reflects on the surface of the half mirror respectively. According to the height measuring apparatus, the image sensors reliably take the reflected images of the slit light by use of the telecentric lenses. However, an optical axis of the slit light and an imaging optical axis are inclined relative to the vertical axis at 45 degrees, and thus blind spots are generated when taking an image of a surface having a number of relatively deep grooves.

A need thus exists for a concave-convex surface inspection apparatus which is not susceptible to the drawback mentioned above. A need thus exists for a concave-convex surface inspection apparatus that reduces blind spots occurring when measuring a concavo-convex surface of an object to be inspected.

SUMMARY OF THE INVENTION

According to an aspect of the present invention, a concave-convex surface inspection apparatus includes a slit light source unit emitting a slit light to a concave-convex surface of an object to be inspected, an image-taking unit taking an image of the concave-convex surface illuminated by the emitted slit light with an imaging optical axis intersecting with an optical axis of the slit light with a narrow-angle equal to or narrower than 30 degrees, and an evaluation section obtaining a three dimensional shape of the concave-convex surface based on the image taken by the image-taking unit and evaluating the obtained three dimensional shape, wherein the slit light source unit includes a slit light source and a cylindrical lens converting the slit light projected by the slit light source into parallel light beams parallel to the optical axis of the projected slit light, the image-taking unit includes a telecentric lens unit and an image-taking section having an imaging surface tilted relative to the imaging optical axis at a tilt angle being defined in accordance with an intersection angle of the optical axis of the slit light and the imaging optical axis for increasing a focusing range of the concave-convex surface, and the image-taking unit further includes a P polarizer positioned on the imaging optical axis for suppressing an incidence of an S polarized light to the imaging surface.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
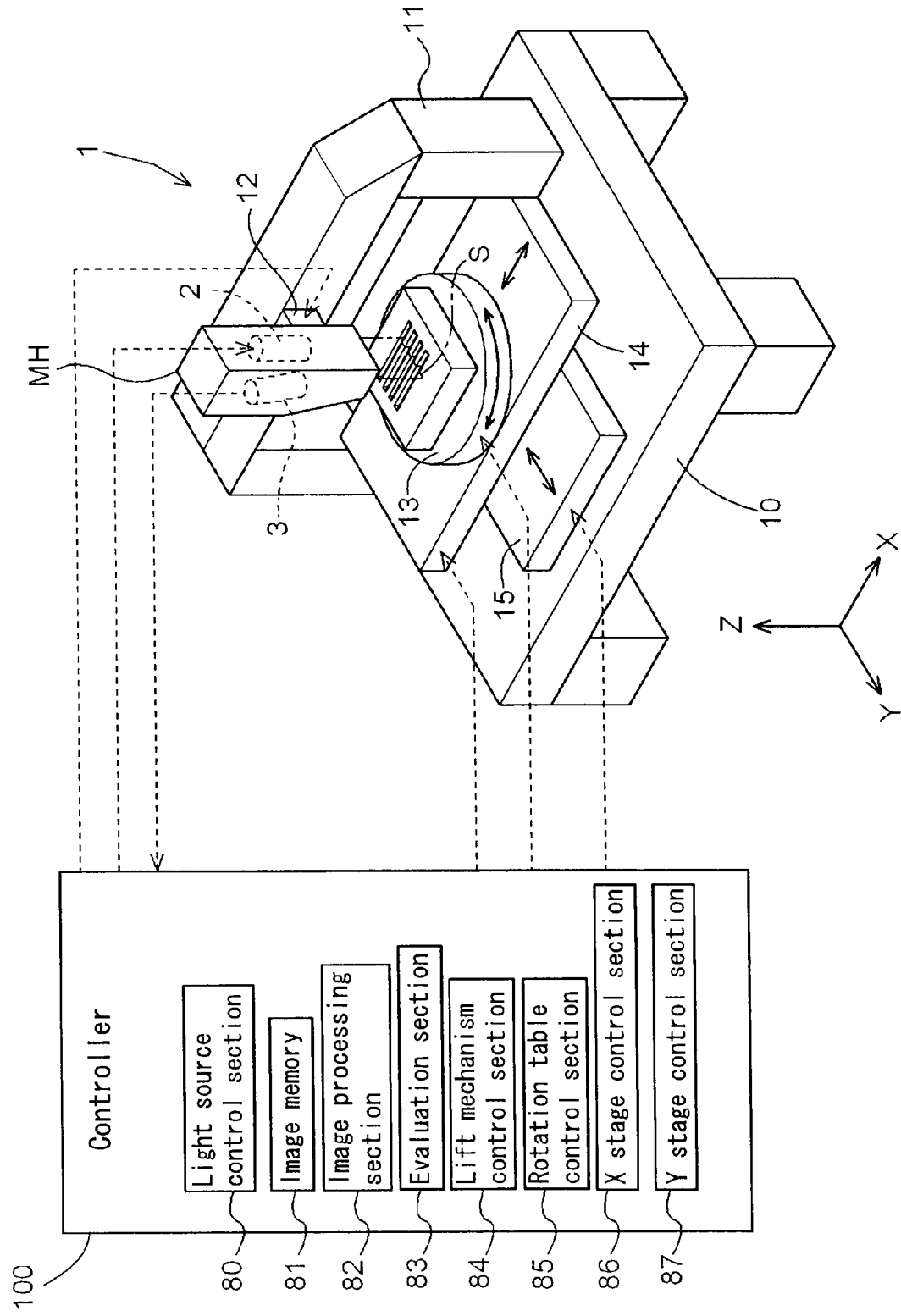
FIG. 1 is a perspective view schematically illustrating a structure of a surface inspection apparatus incorporating a concave-convex surface inspection apparatus according to the embodiment.

As a concave-convex surface inspection apparatus of one embodiment of the invention, a surface inspection apparatus inspecting cross-sections of a number of deep linear grooves formed on a surface of an object to be inspected in a manner that the grooves are aligned with one another will be described hereinbelow with reference to the attached drawings. FIG. 1 is a perspective view schematically illustrating a structure of the surface inspection apparatus.

The surface inspection apparatus includes a measurement device 1 and a controller 100. The controller 100 controls the measurement device 1 and evaluates measurement results obtained from the measurement device 1. The measurement device 1 includes a slit light source unit 2 which is a laser type and emits, i.e., projects, a slit light, and an image-taking unit 3 taking an image of an area of the object to be inspected which is emitted, i.e., illuminated, by the slit light. The slit light source unit 2 and the image-taking unit 3 are integrally assembled as a measurement head MH. The measurement device 1 includes, as main structure components, a base 10 and an arch-shaped frame 11 mounted on the base 10 in a standing position, and a lift mechanism 12 supporting in a center section thereof the measurement head MH so as to raise and lower the measurement head MH. The measurement device 1 further includes, as a positioning mechanism of the object to be inspected, a rotary table 13, an X stage 14 and a Y stage 15. The rotary table 13 accepts thereon the object to be inspected and rotates. The X stage 14 and the Y stage 15 move in an X direction and in a Y direction respectively, and constitute an X-Y motion mechanism moving the rotary table 13 (i.e. plane orthogonal to an optical axis of the slit light) on an X-Y plane.

The controller 100 is essentially a computer unit and includes a light source control section 80, an image memory 81, an image processing section 82, an evaluation section 83, a lift mechanism control section 84, a rotation table control section 85, an X stage control section 86 and a Y stage control section 87, which are related to this invention. The rotation table control section 85, the X stage control section 86 and the Y stage control section 87 control movements of the rotary table 13, the X stage 14 and the Y stage 15 respectively to position the object to be inspected in an appropriate position on a measurement surface (i.e., X-Y plane). The lift mechanism control section 84 controls a movement of the lift mechanism 12 so that a height of the measurement head MH, in other words, a distance between the measurement head M and the object to be inspected, is appropriately set for the measurement.

Figure 2:
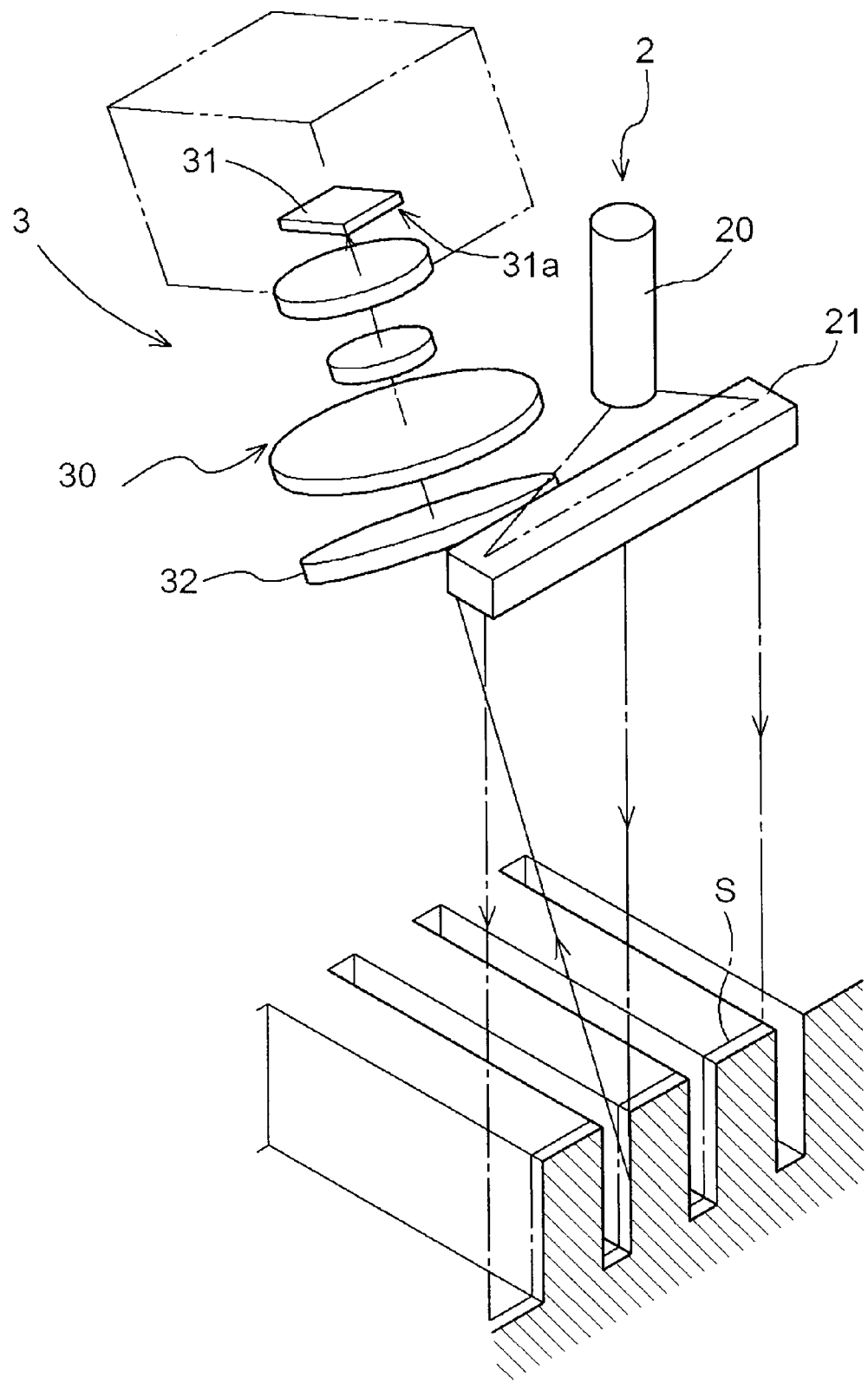
FIG. 2 is a perspective view illustrating a structure of a measurement head.

As shown in FIG. 2, the slit light source unit 2 includes a laser slit light projector 20 serving as a slit light source, and a cylindrical lens 21 converting a slit light projected by the laser slit light projector 20 into a parallel light, i.e., parallel light beams, parallel to the optical axis of the slit light. The slit light, which is projected by the laser slit light projector 20 and diffused in a shape of a fan, is converted into the light beams parallel to the optical axis of the slit light by the cylindrical lens 21, and then illuminates the object to be inspected.

Figure 3:
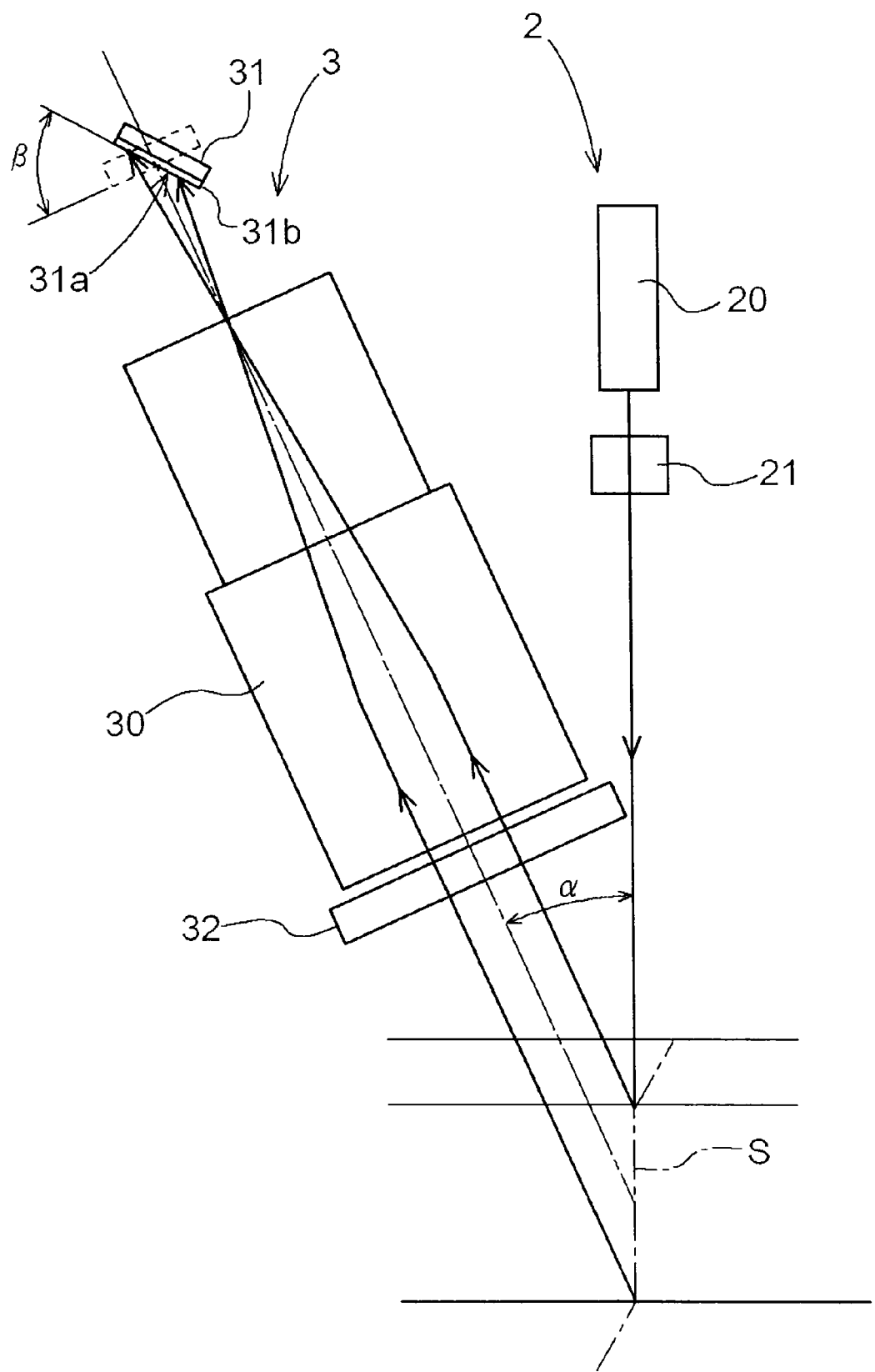
FIG. 3 is a developed view schematically illustrating a relationship between an optical axis of the slit light and an imaging optical axis, and a relationship between the imaging optical axis and an imaging surface.

The image-taking unit 3 includes a telecentric lens unit 30, an image-taking section 31 constituted by a number of light receiving elements (CCD or CMOS) arranged to form a plane and a P polarizer 32. The P polarizer 32 is positioned so as to be closer to the object to be inspected than the telecentric lens unit 30 is close to the object to be inspected. As shown in FIG. 3, the slit light from the slit light source unit 2 is emitted to a surface of the object to be inspected. A reflected light from the surface of the object to be inspected travels along an imaging optical axis of the image-taking unit 3, passes through the P polarizer 32 and the telecentric lens unit 30, and finally reaches the image-taking section 31. In this embodiment, an intersection angle (i.e. an image angle α) between the optical axis of the slit light and the imaging optical axis is approximately 11 degrees, which is an extremely narrow angle. Therefore, when an imaging surface 31a of the image-taking section 31 is positioned so as to be perpendicular to the imaging optical axis as drawn with dotted lines in FIG. 3, and when a range of a measurement depth along a direction of the optical axis of the slit light exceeds a depth of field of the telecentric lens unit 30, an area where the image is out of focus is generated within the range of the measurement depth. To avoid the above-mentioned case, the imaging surface 31a of the image-taking section 31 is tilted relative to the imaging optical axis in order to provide a tilt angle β, thereby increasing the depth of field of telecentric lens unit 30 by applying the principle of the tilt mechanism. Thus, a focused image is obtained even in a measurement range that exceeds the depth of field of the telecentric lens unit 30.

Figure 4A:
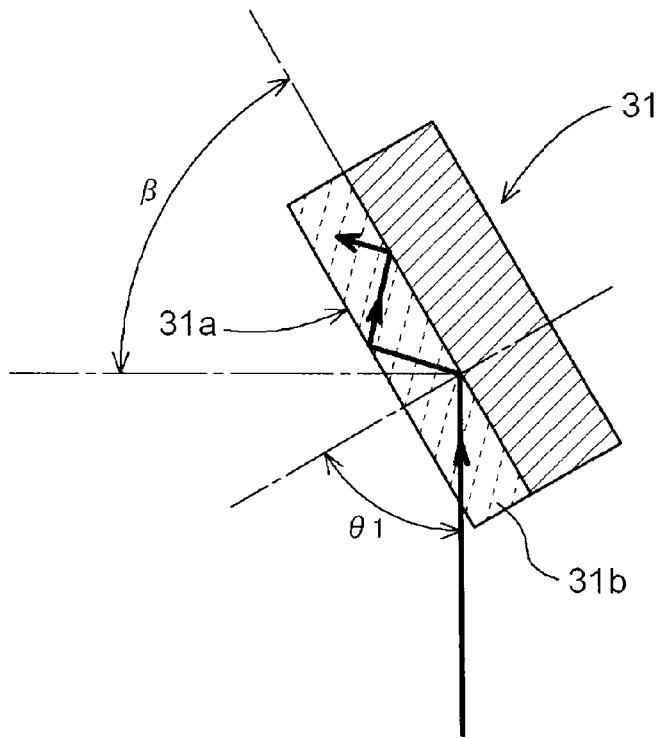
FIG. 4A is a view schematically illustrating a light beam at the image-taking section to explain a reflecting behavior of the light incident to an image-taking section.
Figure 4B:
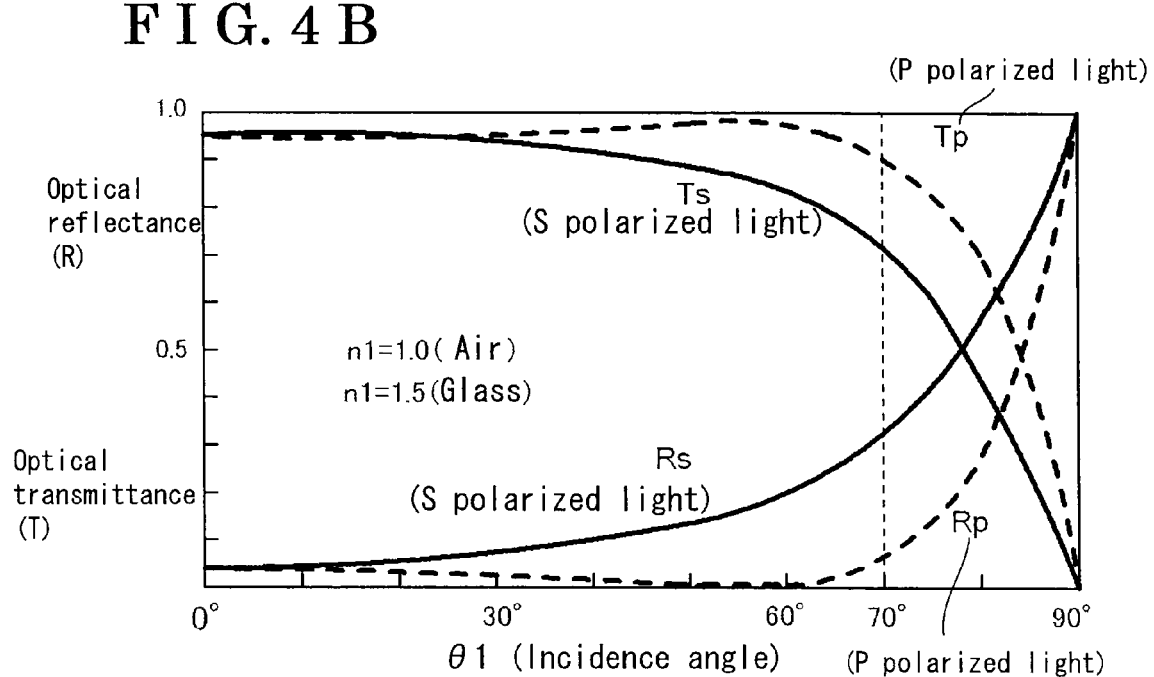
FIG. 4B is a graph showing optical reflectance and optical transmittance of an S polarized light and a P polarized light.

However, when the tilt angle β is increased, reflection occurs on boundary of a cover glass 31b provided on the imaging surface 31a of the image-taking section 31, resulting in noises of the image formed. It is preferable that the tilt angle β is approximately equal to an incidence angle θ1 of the imaging optical axis. As shown in FIG. 4B, in case that the incidence angle θ1 of the imaging optical axis and the tilt angle β are both approximately 70 degrees, and a light beam strikes glass at approximately 70 degrees, optical reflectance of an S polarized light is more than 30 percent, while optical reflectance of a P polarized light is only approximately 3 percent. Consequently, in this embodiment, the P polarizer 32 is positioned on the imaging optical axis and the tilt angle β is set to be approximately 70 degrees in order to decrease the noises attributed to the reflection occurring on the boundary of the cover glass 31b and, at the same time, for sufficiently expanding the depth of field by applying the principle of the tilt mechanism.

The image (image data) sent from the image-taking unit 3 to the controller 100 is transmitted to the image memory 81. Then, in the image processing section 82, an image data processing including coordinate conversion, level correction, edge detection and so forth is performed as needed, and an optical cutting line S generated by the slit light is detected. As an illumination point and angle of the slit light, and the angle between the optical axis of the slit light and the imaging optical axis are known, a three dimensional cross-sectional shape of the optical cutting line S, that is, the three dimensional cross-sectional shape of the deep linear grooves is obtained in the evaluation section 83 by performing calculation based on the triangularization method according to coordinate values of the optical cutting line S detected in the image processing section 82. Instead of the calculation based on the triangularization, a table containing calculation results based on the triangularization method may be used. When the measurement of each measurement block, which is segmented in advance, of the object to be inspected is completed, the measurement data is inspected and determined by comparing it to a geometry data of the corresponding measurement block.

Figure 5:
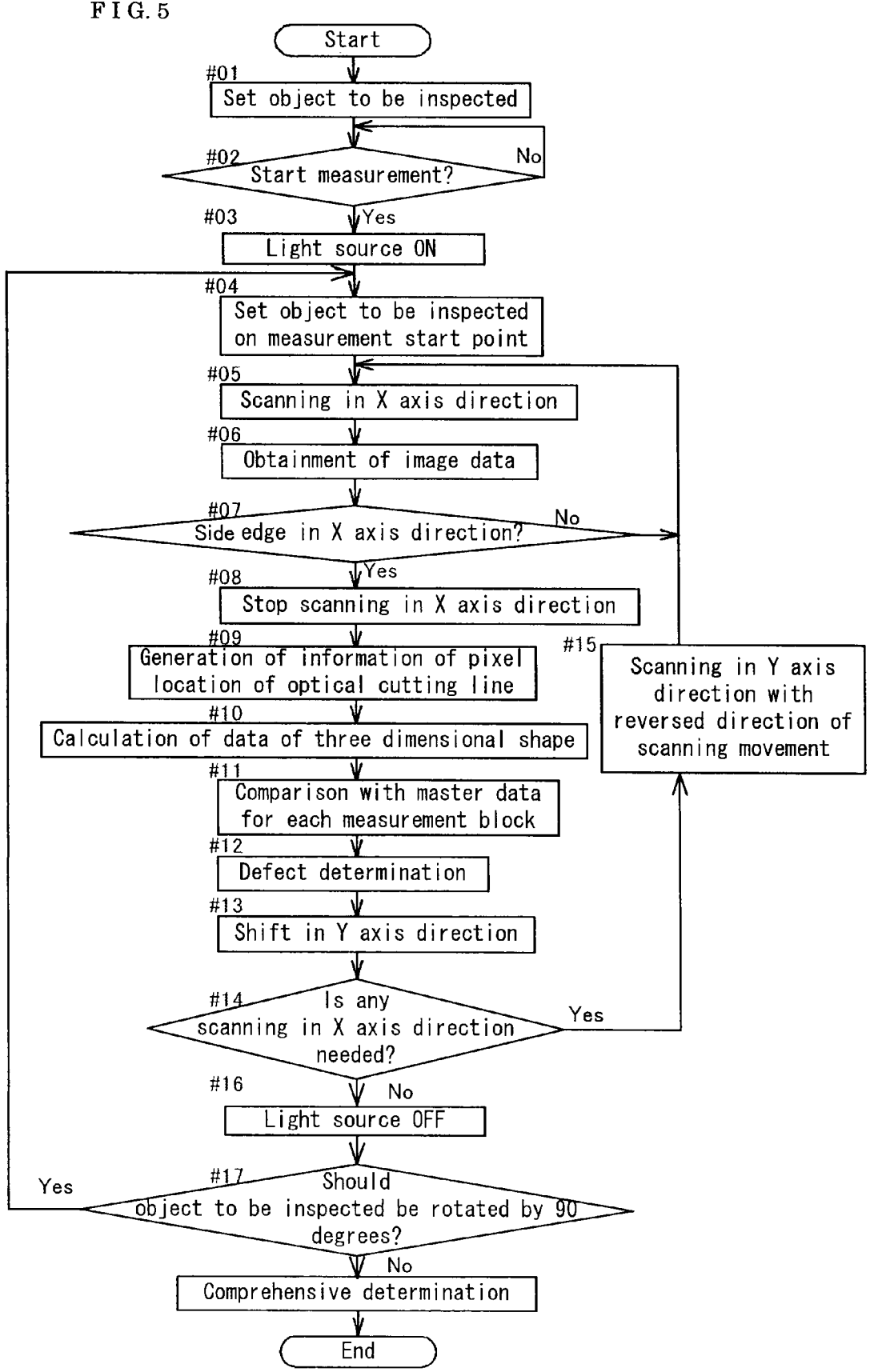
FIG. 5 is a flowchart showing an inspection process of a concave-convex surface inspection apparatus of one embodiment.

An inspection process of the surface inspection apparatus having the above-mentioned structure will be described hereinbelow with reference to a flowchart shown in FIG. 5. Here the object to be inspected refers to a rectangular plate having a number of the deep linear grooves formed on a surface thereof, whose measurement area is approximately 400 mm by 300 mm. The measurement area of the object to be inspected is segmented into the measurement blocks each of which is 100 mm by 15 mm. By single scanning movement in the X axis direction, four measurement blocks are scanned and data of the three dimensional cross-sectional shape of the deep linear grooves is obtained. The data is sorted for each measurement block and stored in the image memory 81. Each time the single scanning movement in the X axis direction is completed, the Y stage moves in the Y direction at a predetermined pitch and the scanning movement in the X axis direction is performed on the next measurement block. A direction of the scanning movement in the X axis direction is opposite from that of the previous scanning movement. By repeating the scanning in the X axis direction and the shifting movement of the Y stage as described above, the data of the three dimensional cross-sectional shape of the deep linear grooves of the entire measurement area is obtained. Next, in consideration of blind spots where the scanning has failed to be performed, the object to be inspected is rotated by 90 degrees and the same sequence of the scanning as the above is performed on the measurement area. The data of the three dimensional cross-sectional shape is evaluated for each measurement block, in other words, the inspection of the object to be inspected is performed for each measurement block, and the inspection results of all the measurement blocks are collected for performing a final comprehensive determination.

To perform the above-described inspection, the object to be inspected is set on the rotary table 13 (#01). When a measurement start button is activated (Yes in #02), the measurement starts. First, the light source control section 80 causes the laser slit light projector 20 to be turned on, and the slit light is projected (#03). Then, the rotation table control section 85 controls the X stage 14, the Y stage 15 and the rotary table 13 to move so that a measurement start point, i.e., a right edge of the measurement block to be measured first, is illuminated by the slit light (#04).

The scanning in the X axis direction is performed while the X stage 14 is moved in the positive direction at a constant speed (#05). At the same time, the image data is sent from the image-taking unit 3 to the image memory 81 (#06). The scanning in the X axis direction and obtainment of the image data are performed until the slit light comes to a side edge of the object to be inspected. When the slit light comes to the side edge of the object to be inspected (Yes in #07), the scanning in the X axis direction is stopped (#08).

When the scanning in the X axis direction is stopped, the forwarded image data is processed and information of a pixel location of the optical cutting line of the image data is generated in the image processing section 82 (#09). In the evaluation section 83, the data of the three dimensional shape of the deep linear grooves is read from the table, referring to the information of the pixel location of the optical cutting line. The table contains a relationship between the pixel location and a three dimensional position that is calculated from the pixel location. The calculated data is stored in a memory address associated with the measurement position (#10). Alternatively, instead of using the table, the data of the three dimensional shape of the deep linear grooves may be calculated each time as needed based on the triangularization method referring to the information of the pixel location of the optical cutting line. Next, for each measurement block, the obtained data of the three dimensional shape is compared to a master data, i.e., data of a target three dimensional shape (#11). Based on the comparison result, a defect determination is performed for each measurement block in accordance with a defect threshold of the shape of the deep grooves (#12). When the scanning in the X axis direction is stopped, the Y stage 15 is operated and the shift operation in the Y axis direction takes place at the predetermined pitch (#13). Thus, an evaluation process performed in Steps #09 to #12 and a shift process in the Y axis direction in Step #13 take place simultaneously. After the evaluation process and the shift process are completed, a check is made to see whether or not any more scanning operation in the X axis direction is necessary (#14).

When the check in Step #14 shows that the scanning operation in the X axis direction is necessary (Yes in #14), the direction of the scanning movement is reversed and the inspection process goes back to Step #15 and the scanning in the X axis direction is performed. When the check in Step #14 shows that no scanning operation in the X axis direction is necessary (No in #14), the laser slit light projector 20 is turned off and the emission of the slit light is stopped (#16). Further, a check is made to see whether or not the rotary table 13 needs to be rotated by 90 degrees to compensate the missing measurement data due to the blind spot (#17). When the rotary table 13 needs to be rotated by 90 degrees (Yes in #17), the rotary table 13 is rotated by 90 degrees and the inspection process goes back to Step #03 to repeat the measurement. When the scanning after rotation of the rotary table 13 by 90 degrees is not sufficient to compensate all the missing data, the rotary table 13 is rotated by 90 degrees up to another two times (i.e., orientation of the rotary table 13 displaced by 180 degrees and 270 degrees respectively relative to the original orientation). When the rotary table 13 does not need to be rotated by 90 degrees (No in #17), the comprehensive determination is made based on the inspection results of all the measurement blocks (#18). During the comprehensive determination, even one defect over all the measurement blocks will cause the object to be inspected to be evaluated as defective. Further, during the comprehensive determination, the position of the defect is marked in an overall view of the object to be inspected and outputted on a display monitor or in a hardcopy form.

In this embodiment, the slit light source unit 2 is positioned so that the optical axis of the slit light is positioned perpendicular to the rotary table 13 which provides a reference horizontal plane on which the object to be inspected is placed. Consequently, the image-taking unit 3 is positioned so that the imaging optical axis thereof is inclined by 30 degrees or narrower, preferably by 11 degrees, relative to the perpendicular line relative to the rotary table 13. Instead of such layout of the measurement head MH, the positions of the slit light source unit 2 and the image-taking unit 3 may be switched. Further, in this embodiment, the P polarizer 32 is positioned so as to be closer to the object to be inspected than the telecentric lens unit 30 is close to the object to be inspected. However, other layout which allows almost only the P polarized light to strike the imaging surface 31*a* of the image-taking section 31 and suppresses the incidence of the S polarized light may be applied. A layout, for example, where the P polarizer is positioned on the imaging optical axis between the telecentric lens unit 30 and the image-taking section 31 may be applied.

According to this embodiment, the optical axis of the slit light intersects with the imaging optical axis at the narrow-angle of 30 degrees or narrower, thereby decreasing the blind spots of which the images are not taken, and allows the slit light source unit 2 and the image-taking unit 3 to be assembled in a compact manner. Further, the slit light is converted into the parallel light beams by use of the cylindrical lens 21 before illuminating the object to be inspected, thereby decreasing the blind spots that receive the slit light beams lying away from the optical axis of the slit light. Still further, the imaging surface 31*a* of the image-taking section 31, which is constituted by the light receiving elements, is tilted relative to the imaging optical axis, in other words, the principle of the tilt mechanism is applied to increase the depth of field. This achieves the measurement range that is larger than the depth of field of the lens. Consequently, the measurement range where the image is focused is sufficiently obtained even though the intersection angle of the optical axis of the slit light and the imaging optical axis is as narrow as 30 degrees or less. However, when the imaging surface 31*a* of the image-taking section 31 has the tilt angle $\beta$, an image light obliquely strikes the light receiving elements and the reflection occurs on the boundary of the cover glass 31*b*, resulting in the noises of the image. This problem is solved by providing the P polarizer 32 on the imaging optical axis so that almost only the P polarized light, which presents extremely lower optical reflectance than the S polarized light when the incidence angle is as large as 60 degrees, strikes the light receiving elements.

As stated above, when inspecting the concave-convex surface having a number of deep grooves, the intersection angle of the optical axis of the slit light and the imaging optical axis needs to be narrowed in order to reduce the blind spots of which the images are not taken. The narrow intersection angle, however, brings various problems including a decrease in the measurement range where the image is focused, difficulty related to positioning the slit light source unit 2 and the image-taking unit 3, and a reduction in accuracy of the triangulation. Although these problems are solved by the above-mentioned characteristics of this embodiment, the optimum conditions needed to solve these problems, such as angles to be applied, vary depending on a shape of the concave-convex surface to be measured. It has been confirmed experimentally that the optimum intersection angle of the optical axis of the slit light and the imaging optical axis is within a vicinity of 11 degrees when inspecting the concave-convex surface having the deep grooves having rectangular cross sections by applying the structure of this embodiment.

According to the above described embodiment, the slit light source unit 2 and the image-taking unit 3 are positioned so that either one of the imaging optical axis and the optical axis of the slit light is perpendicular to the concave-convex surface.

Consequently, the blind spots that do not receive the slit light or the blind spots of which the images are not taken are reduced when, in particular, the surface includes the deep grooves having the rectangular cross sections.

According to the above described embodiment, the P polarizer 32 is positioned between the telecentric lens unit 30 and the object to be inspected.

The P polarizer 32 may be positioned between the telecentric lens unit 30 and the image-taking section 31 or alternatively positioned between the telecentric lens unit 30 and the object to be inspected. However, positioning the P polarizer 32 between the telecentric lens unit 30 and the image-taking section 31 changes a light path length between the telecentric lens unit 30 and the image-taking section 31, which requires a complicated optical design. On the contrary, when the P polarizer 32 is positioned between the telecentric lens unit 30 and the object to be inspected, a change in the light path length between the telecentric lens unit 30 and the object to be inspected is easily adjusted by adjusting focus, which is more convenient.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A concave-convex surface inspection apparatus, comprising:
    a slit light source unit which emits a slit light to a concave-convex surface of an object to be inspected;
    an image-taking unit which takes an image of the concave-convex surface illuminated by the emitted slit light with an imaging optical axis intersecting with an optical axis of the slit light with a narrow-angle equal to or narrower than 30 degrees; and
    an evaluation section which obtains a three dimensional shape of the concave-convex surface based on the image taken by the image-taking unit and evaluating the obtained three dimensional shape, wherein
    the slit light source unit includes a slit light source and a cylindrical lens which converts the slit light projected by the slit light source into parallel light beams parallel to the optical axis of the projected slit light,
    the image-taking unit includes a telecentric lens unit and an image-taking section having an imaging surface tilted relative to the imaging optical axis at a tilt angle being defined in accordance with an intersection angle of the optical axis of the slit light and the imaging optical axis for increasing a focusing range of the concave-convex surface,
    the image-taking unit further includes a P polarizer positioned on the imaging optical axis for suppressing an incidence of an S polarized light to the imaging surface and a cover glass provided on the imaging surface of the image taking section,
    the slit light is converted into the parallel light beams by the cylindrical lens before illuminating the object to be inspected, and
    the tilt angle is approximately equal to an incident angle of the imaging optical axis, the tilt angle is measured between a plane of the imaging surface and an axis perpendicular to the imaging optical axis and the incident angle of the imaging optical axis is measured between the imaging optical axis and a normal of the imaging surface.

2. The concave-convex surface inspection apparatus according to claim 1, wherein the slit light source unit and the image-taking unit are positioned so that either one of the imaging optical axis and the optical axis of the slit light is perpendicular to the concave-convex surface.

3. The concave-convex surface inspection apparatus according to claim 1, wherein the P polarizer is positioned between the telecentric lens unit and the object to be inspected.

4. The concave-convex surface inspection apparatus according to claim 1, wherein the slit light source is a laser slit light projector.

5. The concave-convex surface inspection apparatus according to claim 1, wherein the tilt angle and the incident angle are both approximately 70 degrees.

6. The concave-convex surface inspection apparatus according to claim 1, further comprising
    a rotary table which accepts thereon the object to be inspected; and
    a rotation table control section which controls rotation of the rotary table.

* * * * *